United States Patent
Satou et al.

(10) Patent No.: US 6,548,603 B1
(45) Date of Patent: Apr. 15, 2003

(54) MODIFIED POLYOLEFIN RESIN COMPOSITION

(75) Inventors: Tsukasa Satou, Yokkaichi (JP); Yuuichi Shimizu, Yokkaichi (JP); Satoru Yamamoto, Yokkaichi (JP); Kazunori Yano, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/533,007

(22) Filed: Mar. 22, 2000

(30) Foreign Application Priority Data

Mar. 24, 1999 (JP) ............................................. 11-079345

(51) Int. Cl.⁷ ............................................. C08F 267/04
(52) U.S. Cl. ........................ 525/285; 525/193; 525/240; 525/263
(58) Field of Search ................................ 525/285, 193, 525/240, 263

(56) References Cited

U.S. PATENT DOCUMENTS 5,367,022 A * 11/1994 Kiang et al. ................. 525/74

FOREIGN PATENT DOCUMENTS

JP       5-125111       5/1993

OTHER PUBLICATIONS

"Molecular Characterization of Maleic Anhydride–Functionalized Polypropylene", B. DeRoover, et al. Journal of Polymer Science; Part A: Polymer Chemistry, vol. 33, pp. 829–842 (1995).

"The Anhydride Content of Some Commercial PP–g–MA: FTIR and Titration", M. Sclavons, et al. Journal of Applied Polymer Science, vol. 62, pp. 1205–1210 (1996).

"Maleic Anhydride Homopolymerization during Melt Functionalization of Isotactic Polypropylene", B. DeRoover, et al. Journal of Polymer Science; Part A: Polymer Chemistry, vol. 34, pp. 1195–1202 (1995).

"$^{13}$CNMR Study of the Grafting of Maleic Anhydride onto Polyethene, Polypropene, and Ethene–Propene Copolymers", W. Heinen, et al. Macromolecules, vol. 29, No. 4, pp. 1151–1157 (1996).

"Simulation of Thermal Degradation, Peroxide Induced Degradation, and Maleation of Polypropylene in a Modular Co–Rotatig Twin Screw Extruder", B. J. Kim, et al. Polymer Engineering and Science, vol. 37, No. 3, pp 576–589 (1997).

* cited by examiner

Primary Examiner—Olga Asinovsky
(74) Attorney, Agent, or Firm—Edwards & Angell, LLP; David G. Conlin; Richard J. Roos

(57) ABSTRACT

A modified polyolefin resin composition according to the present invention comprises a polyolefin resin modified with an unsaturated carboxylic acid and is suitable for imparting a good adhension property. The adhesion property of the modified polyolefin resin composition is largely influenced by the graft structure composed of the unsaturated carboxylic acid polyolefin resin, which is produced upon grafting the polyolefin resin with the unsaturated carboxylic acid

6 Claims, No Drawings

MODIFIED POLYOLEFIN RESIN COMPOSITION

BACKGROUND OF THE INVENTION

The present invention relates to a modified polyolefin resin composition, and more particularly, to a modified polyolefin resin composition containing an unsaturated carboxylic acid-modified polyolefin resin and exhibiting a good adhesion property.

Olefin homopolymers such as polyethylene, polypropylene and poly-1-butene, or copolymers obtained by copymerizing monomers constituting these homopolymers as main components with other copolymerizable monomers (hereinafter referred to totally as "polyolefin resin") have been molded into various products and widely used in many applications, because these polymers are relatively inexpensive and excellent in moldability, heat resistance, solvent resistance, mechanical properties, appearance or the like. However, these polyolefin resins are substantially constituted by saturated hydrocarbons and, therefore, exhibit a poor chemical reactivity and a low polarity, thereby causing such a problem that the products made therefrom are poor in adhesion property, coating property, printability or the like. To solve these problems, there have been proposed a method of treating the polyolefin resins with radioactive rays such as electron beam, ozone or the like; and a method of modifying the polyolefin resins by grafting the resins with an ethylenically unsaturated compound such as a vinyl compound, or an unsaturated carboxylic acid or an anhydride thereof (hereinafter referred to totally as "unsaturated carboxylic acid") in the presence of a radical-generating agent such as an organic peroxide.

The grafting methods have been generally classified into so-called solution methods in which the polyolefin resin is subjected to the graft reaction in a solution state by dissolving the polyolefin resin in a solvent, and so-called melt methods in which the polyolefin resin is subjected to the graft reaction in a molten state using a kneading extruder.

In the solution methods, it is necessary to use a large amount of solvent, resulting in high cost. Further, the solution methods are required to conduct additional treatments such as recovery of the used solvent or the like for environmental protection. Whereas, in the melt methods, the use of such a solvent is not required, so that the melt methods are noticeable as simple and convenient methods.

However, modified polyolefin resins produced by the melt methods contain a considerable amount of residual components such as unreacted compounds (ungrafted ethylenically unsaturated compounds), oligomers (oligomers of ethylenically unsaturated compounds) and other by-products. When these residual components are present in the obtained modified polyolefin resin, there arises such a problem that the adhesion property, coating property and printability thereof are severely damaged.

In order to remove these residual components from the modified polyolefin resin, there have been proposed a method of treating the grafted modified polyolefin resin with a solvent substantially incapable of dissolving the modified polyolefin resin therein and capable of dissolving the polyolefin resin as a raw material and unsaturated carboxylic acid, or under such conditions ("dissolution reprecipitation method", Japanese Patent Application Laid-Open (KOKAI) No. 54-99193(1979)); a method of producing a modified polypropylene resin by heat-drying the grafted polypropylene resin at a temperature of not less than 60° C. ("heat-drying method", Japanese Patent Application Laid-Open (KOKAI) No. 56-95914(1981)); a method of producing a modified polyolefin resin by treating the modified polyolefin resin with warm or hot air, or warm or hot water in a temperature range between a Vicat softening temperature of the polyolefin resin as a raw material and a temperature lower by 25° C. than the Vicat softening temperature. ("warm or hot treatment method", Japanese Patent Application Laid-Open (KOKAI) No. 56-118411(1981)); or the like.

However, in any of these conventional methods, many unimproved problems still remain. That is, in the "dissolution reprecipitation method", there are caused problems that a considerably large amount of a solvent such as acetone is used, and not only the complicated operations but also the disadvantages are suffered due to the use of the organic solvent as in the above "solution method". In the "heat-drying method", the residual components, especially the oligomers of ethylenically unsaturated compounds, cannot be sufficiently removed, and there arises a further problem that the modified polyolefin resin tends to be colored upon the heat-drying. The "warm or hot treatment method" is also insufficient in removal of the residual components, and cannot sufficiently prevent the obtained products from being discolored.

As a result of the present inventors' earnest studies concerning an unsaturated carboxylic acid-modified polyolefin resin obtained by the melt method, which is suitable for imparting a good adhesion property, it has been found that the adhesion property is largely influenced by the graft polymer structure composed of the unsaturated carboxylic acid and polyolefin resin, which is produced upon grafting the polyolefin resin with the unsaturated carboxylic acid. The present invention has been attained on the basis of this finding.

SUMMARY OF THE INVENTION

It is an object of the present invention to provide a modified polyolefin resin composition containing an unsaturated carboxylic acid-modified polyolefin resin, which is free from the above-described problems and exhibits a good adhesion property.

In a first aspect of the present invention, there is provided a modified polyolefin resin composition comprising a polyolefin resin modified with an unsaturated carboxylic acid, and satisfying the following formulae (I) and (II) with respect to a small-angle X-ray scattering which is incident perpendicularly on said composition melted at 170° C.:

when a wave number vector (s) is in the range of 0.003 $Å^{-1}$ to 0.006 $Å^{-1}$, $$-5.0 \leq A \leq -3.0 \quad \text{(I)}$$

wherein A represents a gradient of a characteristic curve obtained by plotting logarithms of a corrected scattering intensity ($I_1(s)$) on Y (ordinate) axis and the wave number vector (s) on X (abscissa) axis; and said corrected scattering intensity ($I_1(s)$) is a value obtained by subtracting a product of an air scattering intensity and an X-ray transmittance and a background intensity based on thermal diffuse scattering, from the small-angle X-ray scattering intensity;

$$0.001 \geq Qn/P \geq 0.0001 \quad \text{(II)}$$

wherein Qn and P are values calculated from the following formulae (1) and (2), respectively:

$$Qn = \int_{0.003}^{0.007} s^2 I_1(s)ds \bigg/ \int_{0.02}^{0.04} s^2 I_2(s)ds \quad (1)$$

wherein s is a wave number vector; $I_1(s)$ is a corrected scattering intensity; and $I_2(s)$ is a scattering intensity at 170° C. of polyolefin before modification, $$P = \int_{0.003}^{0.007} s^2 I_1(s)ds/M \quad (2)$$

wherein M is an average value of $s^4 I_1(s)$ when s is in the range of 0.003 Å$^{-1}$ to 0.004 Å$^{-1}$.

In sub-aspects of the present invention, there are provided an unsaturated carboxylic acid-modified polyolefin resin composition wherein the said unsaturated carboxylic acid is maleic acid or maleic anhydride, and wherein the said polyolefin resin is polypropylene.

In another sub-aspects of the present invention, there are provided an unsaturated carboxylic acid-modified polyolefin resin composition wherein the said polyolefin resin before modification has a melt flow rate of 0.01 to 200 g/10 minute, and wherein the modification of the said polyolefin resin with the said unsaturated carboxylic acid is carried out by melt-kneading said polyolefin and the said unsaturated carboxylic acid in the presence of an organic peroxide.

In an other sub-aspect of the present invention, there is provided an unsaturated carboxylic acid-modified polyolefin resin composition wherein the said polyolefin modified with the said unsaturated carboxylic acid has a melt flow rate of 200 to 2,000 g/10 minutes, and the amount of said unsaturated carboxylic acid grafted onto said polyolefin resin is 0.3 to 2.5% by weight based on the total weight of the polyolefin resin.

In a second aspect of the present invention, there is provided a polyolefin-based resin composition comprising the said unsaturated carboxylic acid-modified polyolefin resin composition and another polyolefin-based resin, and having a T-peel strength of not less than 300 g/cm when measured between an ethylene-vinyl alcohol copolymer film and a film formed from the said polyolefin-based resin composition having an unsaturated carboxylic acid content of 0.08% by weight based on the total weight of resins contained in the said composition.

DETAILED DESCRIPTION OF THE INVENTION

The modified polyolefin resin composition according to the present invention is described in order of production process, raw materials used and method of measuring a small-angle X-ray scattering.

(1) Process for Producing an Unsaturated Carboxylic Acid-modified Polyolefin

The modified polyolefin resin composition according to the present invention can be produced by melt-kneading a polyolefin resin as a raw material with a mixture of an unsaturated carboxylic acid and organic peroxide.

In order to obtain the modified polyolefin resin composition according to the present invention, the weight ratio of the organic peroxide to the unsaturated carboxylic acid (organic peroxide:unsaturated carboxylic acid) is preferably in the range of 0.5:1 to 10:1. When the weight ratio of the organic peroxide to the unsaturated carboxylic acid is less than 0.5:1 or more than 10:1, the polyolefin resin cannot be properly modified with the unsaturated carboxylic acid, so that the small-angle X-ray scattering value of the obtained unsaturated carboxylic acid-modified polyolefin resin tends to be out of the range specified by the present invention. As a result, the modified polyolefin resin composition tends to be deteriorated in adhesion to base materials such as polyamide resins, metals, glass, polyester resins, ethylene-vinylalcohol copolymer or the like.

The apparatus usable for the melt-kneading is not particularly restricted. For example, as the melt-kneading apparatuses, there may be used batch-type kneaders such as a Banbury-mixer, continuous kneading machines such as single-screw or multi-screw kneaders, or the like. Among these apparatuses, a twin-screw kneading extruder is especially preferred because of high kneading performance thereof.

The kneading temperature is such a temperature at which the polyolefin resin as a raw material can be melted, and is in the range of preferably 150 to 260° C., more preferably 160 to 230° C. Here, the "kneading temperature" means a cylinder temperature of the extruder used.

The kneading time is usually 0.05 to 30 minutes, preferably 0.1 to 10 minutes.

When the kneading temperature is too low or the residence time is too short, the organic peroxide cannot be decomposed to a sufficient extent. On the contrary, when the kneading temperature is too high or the residence time is too long, the polyolefin resin tends to preferentially undergo thermal decomposition reaction rather than being modified with the unsaturated carboxylic acid. In any of these cases, it is difficult to produce the unsaturated carboxylic acid-modified polyolefin resin composition having the aimed properties.

In order to obtain the unsaturated carboxylic acid-modified polyolefin resin composition according to the present invention, it may be further required to satisfy other kneading conditions such as flow rate and kneading strength in addition to the above-specified conditions. For example, in the case where a twin-screw extruder is used, these conditions may be determined by repeating experimental simulations for screw shape, L/D ratio, screw speed or the like.

(2) Raw Materials Used
(A) Polyolefin Resin

As the polyolefin resins used for the production of the modified polyolefin resin composition according to the present invention, there may be exemplified homopolymers composed of α-olefins having 2 to 20 carbon atoms such as ethylene, propylene, 1-butene, 1-hexene, 3-methyl-1-butene, 4-methyl-1-pentene, 1-heptene, 1-octene, 1-decene or the like; random polymers or block polymers of at least two monomers selected from these α-olefins; random copolymers, block copolymers or graft copolymers obtained by copolymerizing the above-mentioned α-olefins as a main component with other copolymerizable monomers; or mixtures of the above-mentioned polymers.

Examples of the preferred polyolefin resins may include polyethylene-based resins and polypropylene-based resins having a melt flow rate of 0.01 to 200 g/10 minutes, preferably 0.1 to 100 g/10 minutes when measured according to JIS K7210 (in the case of ethylene-based resins, measured at 190° C. under a load of 2.16 kg, and in the case of propylene-based resins, measured at 230° C. under a load of 2.16 kg). Among these polyolefin resins, the polypropylene-based resins are especially preferred.

(B) Unsaturated Carboxylic Acid

As the unsaturated carboxylic acids used for the production of the modified polyolefin resin composition according to the present invention, maleic anhydride is preferred in the consideration of its high reactivity or the like.

The amount of the unsaturated carboxylic acid used in the melt-kneading (graft reaction) is usually 0.1 to 20 parts by weight, preferably 0.2 to 10 parts by weight based on 100 parts by weight of the polyolefin resin. When the amount of the unsaturated carboxylic acid used is less than 0.1 part by weight, it may be difficult to obtain a modified polyolefin resin composition having a sufficient adhesion property. On the other hand, when the amount of the unsaturated carboxylic acid used is more than 20 parts by weight, the polyolefin resin grafted with the unsaturated carboxylic acid may not have a well-controlled structure aimed by the present invention, resulting in deteriorated adhesion property thereof.

(C) Organic Peroxide

The suitable organic peroxides used for the production of the modified polyolefin resin composition according to the present invention, are those showing a half value period of one minute at a temperature of 150 to 200° C. (hereinafter referred to merely as "one-minute half value period temperature").

Among them, the organic peroxides whose half value period is 0.1 to 10 times the residence time of the polyolefin resin in the kneader at the melt-kneading temperature upon modification, is especially preferred. For example, when the melt-kneading is carried out at a kneading temperature of 200° C. for a residence time of 60 seconds, it is preferred that the half value period at a temperature of 200° C. of the organic peroxide be in the range of 6 to 600 seconds. Specific examples of such organic peroxides may include dicumyl peroxide, 2,5-dimethyl-2,5-di(t-butyl peroxy) hexane, di-t-butyl peroxide, p-menthane hydroperoxide, 2,5-dimethyl-2,5-di(t-butyl peroxy)-3-hexyne or the like.

Here, the half value period of the organic peroxide means a time required until reducing an initial amount of active oxygen to half value by the thermal decomposition of the organic peroxide. The half value period can be determined by measuring the change with the passage of time in concentration of the organic peroxide when a 0.1 mol/liter solution of the organic peroxide in an inert solvent such as benzene is thermally decomposed (refer to page 162 of "Handbook of Cross-linking Agents (first edition)" published by Taisei-sha, Japan).

When the one-minute half value period temperature of the organic peroxide is less than 150° C., the decomposition velocity of the organic peroxide may be too high, so that the amount of radicals generated which are effective for grafting the polyolefin resin with the unsaturated carboxylic acid, tends to become very small, resulting in insufficient adhesion property of the obtained composition. When the one-minute half value period temperature of the organic peroxide is more than 200° C., the decomposition velocity of the organic peroxide may be too low, so that the graft reaction of the polyolefin resin with the unsaturated carboxylic acid also tends to become insufficient, resulting in deteriorated adhesion property of the obtained composition.

The amount of the organic peroxide used is usually 0.01 to 20 parts by weight, preferably 0.05 to 10 parts by weight based on 100 parts by weight of the polyolefin resin. When the amount of the organic peroxide used is less than 0.01 part by weight, the amount of the unsaturated carboxylic acid grafted tends to be small. When the amount of the organic peroxide used is more than 20 parts by weight, disadvantageous side reactions such as decomposition or dehydrogenation of the polyolefin resin tends to frequently occur, resulting in deteriorated adhesion property of the obtained composition.

(3) Modified Polyolefin Resin Composition

The thus obtained unsaturated carboxylic acid-modified polyolefin resin composition according to the present invention has preferably a melt flow rate of 200 to 2,000 g/10 minutes, and the content of the unsaturated carboxylic acid in the modified polyolefin resin composition is preferably in the range of 0.3 to 2.5% by weight. When the melt flow rate of the modified polyolefin resin is out of the above-specified range, the processing property thereof may tend to be deteriorated.

A polyolefin-based resin composition obtained by mixing the above modified polyolefin resin composition with other polyolefin-based resins so that an unsaturated carboxylic acid content is 0.08% by weight based on the total weight of resins contained in said composition has a T-peel strength of not less than 300 g/cm when measured between an ethylene-vinyl alcohol copolymer film and a film formed from the polyolefin-based resin composition.

The composition comprising the modified polyolefin resin according to the present invention may contain other components in addition to the above-described essential raw materials, unless the addition thereof adversely affects the aims and effects of the present invention. As such other components, there may be exemplified antioxidants, UV absorbers, lubricants, colorants, foaming agents, fillers, conductive agents, anti-static agents, anti-fogging agents, metal deactivating agents, dispersants, flame retardants, processing aids, mold releasing agents, germicides, mildew-proofing agents, molecular-weight controlling agents or the like.

(4) Measurement of Small-angle X-ray Scattering (A) Measurement of Small-angle X-ray Scattering (SAXS)

In the present invention, the small-angle X-ray scattering is measured using as an X-ray source, a rotating anode X-ray generator having a copper anode. Only a Cu-Kα ray is extracted from the emitted X-rays by an X-ray monochromator using a graphite crystal, and used as an incident X-ray.

A specimen to be measured is heat-treated at 130° C. for 5 hours under vacuum conditions, and allowed to stand at 190° C. for 5 minutes in a sample cell maintained under a nitrogen atmosphere. Thereafter, the specimen is cooled to 170° C., and the X-ray is incident on the specimen. The thickness of the specimen is 2 mm.

Upon incidence of the X-ray onto the specimen to be measured, the shape of the X-ray is diaphragmed through two X-ray slits each having an 1 mmφ opening and being disposed at a distance of not less than 50 cm apart from each other.

The X-ray intensity scattered from the specimen is measured at a scattering angle of 0 to 3.5° using an X-ray proportional counter disposed at a distance of 1.5 m from the specimen, thereby obtaining data of scattering intensity distribution.

Then, a product of a scattering intensity measured under a specimen-omitting condition (blank) (usually called "lair scattering intensity") and an X-ray transmittance is subtracted from the obtained data of scattering intensity distribution, thereby obtaining the difference value therebetween. Here, the X-ray transmittance means a percentage of an intensity of X-ray non-scattered and penetrated through the specimen, to that of the incident X-ray.

Then, a corrected scattering intensity ($I_1(s)$) is obtained by subtracting a background intensity due to thermal diffuse scattering from the above difference value.

Meanwhile, the background intensity due to thermal diffuse scattering is determined by subjecting the scattering intensity of X-ray present on a wider angle side than such a scattering angle providing a minimum scattering intensity at a scattering angle of not less than 2°, to curve-fitting according to the following formula:

(Background intensity)=$as^2+b$      5 wherein a and b are variables optimized by the curve-fitting; and s is a wave number vector represented by the formula: s=2 sin θ/1.542, wherein 2θ is a scattering angle.

(B) Evaluation of Morphology of Specimen to Be Measured

The corrected scattering intensity ($I_1(s)$) has a certain relation to the morphology of the specimen to be measured. In a dilute system, there exists a wave number vector region depending upon the shape of particles as a scattering entity. For example, the asymptotic behavior of the corrected scattering intensity ($I_1(s)$) is represented by $s^{-4}$ in the case of spherical particle, and by $s^{-2}$ and $s^{-1}$ in the case of randomly oriented platelike and rodlike particles, respectively.

Namely, the power of the wave number vector (i.e., means A of $S^A$) in the asymptotic behavior represents the shape of the scattering entity.

In the present invention, the logarithm of the corrected scattering intensity ($I_1(s)$) is plotted relative to that of the wave number vector (s), and the resultant characteristic curve is approximated to a line in the range of a wave number vector (s) of 0.003 Å$^{-1}$ to 0.006 Å$^{-1}$ by a least square method, thereby obtaining A from a gradient of the line.

In the present invention, the thus obtained A value is required to fall within the range of $-5.0 \leq A \leq -3.0$. When the A value is out of the above-specified range, the obtained modified polyolefin resin composition is insufficient in adhesion property.

(C) Evaluation of Inhomogeneity

The normalized invariant (Qn) defined by the following formula is in proportion to a product of a product of respective volume fractions of a continuous phase and a dispersed phase, and a square of a difference in electron density between the respective phases. The larger the Qn, the more remarkable the inhomogeneity of the system.

$$Qn = \int_{0.003}^{0.007} s^2 I_1(s) ds \bigg/ \int_{0.02}^{0.04} s^2 I_2(s) ds \propto (\phi_A \phi_B) \times (\rho_A - \rho_B)^2 \quad (1)$$

wherein $I_1(s)$ is a corrected scattering intensity; $I_2(s)$ is a scattering intensity at a temperature of 170° C. of the polyolefin before modification; $\phi_A$ and $\phi_B$ are volume fractions of the respective phases ($\phi_A+\phi_B=1$); and $\rho_A$ and $\rho_B$ are electron densities of the respective phases.

(D) Particle Size

The P value defined by the following formula and obtained by dividing the "invariant"

$$\left( \int_{0.003}^{0.007} s^2 I_1(s) ds \right)$$

by an average value M of $s^4 I_1(s)$ in the range of a wave number (s) of 0.003 Å$^{-1}$ to 0.004 Å$^{-1}$ which average value M is determined by plotting a product ($s^4 I_1(s)$) of the corrected scattering intensity and the fourth power of the wave number vector, relative to the wave number vector (s), is in proportion to Porod length (($4\phi_A\phi_B$)/$S_{AP}$, wherein $S_{AP}$ is a specific surface area at interface).

$$P = \int_{0.003}^{0.007} s^2 I_1(s) ds / M \quad (2)$$

wherein M is an average value of $s^4 I_1(s)$ when s is in the range of 0.003 Å$^{-1}$ to 0.004 Å$^{-1}$.

(E) Inhomogeneity of System and Particle Size

The above-obtained Qn and P have the following meanings.

(a) In the case where the inhomogeneity conditions are identical and the Porod lengths are identical, the specific surface areas are identical.

(b) In the case where the inhomogeneity conditions are identical and the Porod lengths are different, both of the specific surface areas and the particle sizes are different.

(c) In the case where the inhomogeneity conditions are different and the Porod lengths are identical,
   (i) the specific surface areas are different, the volume is large, and the particle size is small; or
   (ii) the specific surface areas are different, the volume is small, and the particle size is large.

(d) In the case where the inhomogeneity conditions are different and the Porod lengths are different,
   (i) the specific surface areas are identical, and the numbers of particles are different;
   (ii) the specific surface areas are different, the volume is large, and the particle size is large, or
   (iii) the specific surface areas are different, the volume is small, and the particle size is small.

In the present invention, the Qn/P value is required to fall within the range of 0.0001 to 0.001. When the Qn/P value is less than 0.0001, the obtained composition may fail to show a sufficient adhesion property. The resin having a Qn/P value of more than 0.001 is difficult to produce.

(F) Measurement for a Mixture of the Modified Polyolefin Resin Composition and the Other Resin As described above, the modified polyolefin resin composition according to the present invention may be mixed with the other polyolefin-based resin to obtain a polyolefin-based resin composition having a good adhesion property, unless the addition of the other polyolefin-based resin adversely affects the aims and effects of the present invention.

As to the polyolefin-based resin composition in the form of a mixture of the modified polyolefin resin and the other polyolefin-based resin, the measurement of a small-angle X-ray scattering of the diluted composition is also possible depending upon the detection sensitivity. However, when the detection sensitivity is poor or an interfering peak due to additives is generated, the measurement of the small-angle X-ray scattering of such a polyolefin-based resin composition may be carried out after isolating the modified polyolefin resin therefrom by an appropriate separation or fractionation method. For example, the measurement of the small-angle X-ray scattering of the mixture can be conducted by separating the modified polyolefin resin having functional groups from the other olefin-based resins by a column chromatography using an adsorbent such as silica gel or molecular sieve; by separating the composition into the respective resins based on the difference in molecular weight, or existence or non-existence of functional groups by a gel permeation chromatography to remove or recover the modified polyolefin resin therefrom; or the like.

Also, unreacted polyolefin resins which remain unmodified can be recovered to measure the small-angle X-ray scattering intensity thereof by the similar method.

The modified polyolefin resin composition according to the present invention exhibits a good adhesion property.

EXAMPLES

The present invention will be described in more detail by examples, but it is not intended to limit the present invention thereto.

<Evaluation Method>

(A) Melt Flow Rate (MFR)

The melt flow rate (MFR, unit: g/10 minutes) was measured by extruding a melt through an orifice having a diameter of 1 mm at 180° C. under a load of 2.16 kgf. The measured value was multiplied by 75.5, and the obtained value was regarded as a melt flow rate at 230° C.

(B) Content of Maleic Acid

The pelletized modified polyolefin resin composition as a sample was formed into a film having a thickness of about 100 μm using a hot press. The maleic acid content of the thus obtained film was measured from a carbonyl absorption (1780 $cm^{-1}$ peak) of infrared absorption spectrum thereof according to a separately prepared calibration curve. The measured value was determined as a total amount of maleic acid contained in the composition.

Separately, the same pelletized sample was dissolved in boiled xylene and then reprecipitated in acetone. Thereafter, the obtained precipitate was dried in vacuum at 80° C. for 6 hours, thereby preparing a powdery sample. The maleic acid content of the thus obtained powdery sample was measured by the same method as described above. The measured value was determined as an amount of maleic acid grafted to polyolefin.

The amount of maleic acid grafted was divided by the total amount of maleic acid to determine a graft percentage of the maleic acid.

(C) Evaluation of Adhesion Property

Polypropylene (MFR: 0.6 g/10 minutes, ethylene content: 3.9% by weight, propylene-ethylene random copolymer), ethylene-propylene copolymer rubber (MFR: 0.7 g/10 minutes, propylene content: 27% by weight) and maleic anhydride-modified polypropylene prepared by the method as described in the following Examples, were mixed together.

100 parts by weight of the obtained mixture was mixed with 0.10 part by weight of PBK (calcium stearate; "BK" produced by Nitto Kagaku Co., Ltd.), 0.07 part by weight of M329 (tris(mono- and di-mixed nonylphenyl)phosphite, "MARK 329" produced by Adeka Argas CO., Ltd.), 0.05 part by weight of DMTP (dimyristyl-3,3'-thiodipropionate, "RASMIT MG" produced by Dai-ichi Kogyo Seiyaku Co., Ltd.) and 0.05 part by weight of AO30 (1,1,3-tris(2-methyl-4-hydroxy-5-t-butylphenyl)butane, "MARK AO30" produced by Adeka Argas CO., Ltd.), thereby producing a polyolefin-based resin composition.

Meanwhile, the mixing ratio between the respective components was controlled such that the contents of the grafted maleic anhydride and the ethylene-propylene copolymer rubber were 0.08% by weight and 30% by weight, respectively, based on the total weight of resins contained in the composition.

A mixture of the obtained polyolefin-based resin composition and an ethylene-vinyl alcohol copolymer (melting point: 183° C. (peak temperature by DSC method), ethylene content: 32 mol%, MFR: 1.3 g/10 minutes at 190° C. under 2.16 kg load, "EVAL EP-F101A" produced by Kuraray Co., Ltd.) was subjected to two-layer film blowing process at a process temperature of 230° C., a line speed of 5 m/minute and an air gap of 450 mm under conditions shown below, thereby forming a sheet having a thickness of 200 μm (layer structure: polyolefin-based resin composition/EVOH=130 μm/70 μm).

The obtained sheet was cut into a test piece having a width of 1 cm and a length of 12 cm. The test piece was tested at a peel rate of 500 mm/min, using a tensile tester (Shopper) to measure T-peel strength thereof, thereby evaluating an adhesion property of the polyolefin-based resin composition.

Conditions of Two-layer Film Blowing Process (1) Molding Machine

Extruder for inner layer (bore diameter: 40 mm, screw: metering type, L/D: 26, C/R: 3.0, double-thread spiral)

Extruder for outer layer (bore diameter: 40 mm, screw: metering type, L/D: 26, C/R: 3.0, double-thread spiral)

Die (bore diameter: 80 mm, multi-manifold type, outer layer side-feed system, four-thread spiral, length of resin confluence portion: 45 mm)

Water-cooling ring (overflow type, bore diameter: 87 mm)

(2) Process Conditions

Extruder for inner layer:

Resin: ethylene-vinyl alcohol copolymer

Set temperature: C1: 180° C.; C2: 220° C.; C3: 230° C.; C4: 230° C.

Extruder for outer layer:

Resin: unsaturated carboxylic acid-modified polyolefin resin composition

Set temperature: C1: 180° C.; C2: 220° C.; C3: 230° C.; C4: 230° C.

Adapter:

Set temperature: 230° C.

Die:

Set temperature: 230° C. Air ring: not used

<Raw Materials of Modified Polyolefin Resin>

(A) Polyolefin

Propylene homopolymer having an MFR of 1.0 g/10 minutes was used as polyolefin.

(B) Maleic Anhydride

Maleic anhydride as a guaranteed reagent produced by Wako Junyaku Co., Ltd. was used.

(C) Organic Peroxide

Tertiary-butyl peroxide produced by Nippon Yushi Co., Ltd. (one-minute half value period temperature: 185.9° C., tradename: "PERBUTYL D") was used. Meanwhile, the t-butyl peroxide showed half value periods of 690 seconds at 160° C. and 17.7 seconds at 200° C.

<Melt-Kneading Extruder>

A twin-screw extruder whose screws were rotated in the same direction ("TEX44XCT" manufactured by The Japan Steel Works, Ltd.; screw diameter: 47 mm; L/D: 42) was used.

Example 1

A mixture having a composition shown in Table 1 was melt-kneaded under kneading conditions also shown in Table 1 using the above-described extruder, thereby obtaining pellets of maleic anhydride-modified polypropylene resin.

The kneading configuration of the extruder used for the melt-kneading was provided with three kneading blocks (modules), i.e., a right-handed kneading block, a neutral kneading block and a left-handed kneading block.

The respective blocks had shapes and lengths expressed by the screw diameter D and the screw length L as follows.

(i) Right-handed Kneading Block
   Disc thickness (mm): 0.2L/D
   Angle of torsion between adjacent discs: rightward 45°
   Number of discs: five discs for each block
   Block length (mm): 3L/D
(ii) Neutral Kneading Block
   Disc thickness (mm): 0.2L/D
   Angle of torsion between adjacent discs: 90°
   Number of discs: five discs for each block
   Block length (mm): 3L/D
(iii) Left-handed Kneading Block
   Disc thickness (mm): 0.L/D
   Angle of torsion between adjacent discs: leftward 45°
   Number of discs: five discs for each block
   Block length (mm): 1L/D The thus obtained modified polypropylene resin was subjected to evaluation of adhesion property and to measurement of small-angle X-ray scattering by the above-described methods. The results are shown in Table 1.

Examples 2 to 7

The same procedure as defined in Example 1 was conducted except that the kneading configuration was replaced with that provided with three kneading blocks including a right-handed kneading block, a neutral kneading block and a left-handed kneading block as described below, thereby producing a modified polypropylene resin.
(i) Right-handed Kneading Block
   Disc thickness (mm): 0.2L/D
   Angle of torsion between adjacent discs: rightward 45°
   Number of discs: five discs for each block
   Block length (mm): 3L/D
(ii) Neutral Kneading Block
   Disc thickness (mm): 0.2L/D
   Angle of torsion between adjacent discs: 90°
   Number of discs: five discs for each block
   Block length (mm): 9L/D
(iii) Left-handed Kneading Block
   Disc thickness (mm): 0.1L/D
   Angle of torsion between adjacent discs: leftward 45°
   Number of discs: five discs for each block
   Block length (mm): 1L/D The thus obtained modified polypropylene resin was subjected to evaluation of adhesion property and measurement of small-angle X-ray scattering by the same methods as in Example 1. The results are shown in Table 1.

Comparative Example 1

The same procedure as defined in Example 1 was conducted except that the kneading configuration was replaced with that provided with three blocks each having combined right-handed and left-handed kneading portions as described below and a length of 1L/D (mm) (length of kneading configuration: 3L/D (mm)), thereby producing a modified polypropylene resin.
(i) Right-handed Kneading Portion
   Disc thickness (mm): 0.1L/D
   Angle of torsion between adjacent discs: rightward 45°
   Number of discs: five discs for each portion
(ii) Left-handed Kneading Portion
   Disc thickness (mm): 0.1L/D
   Angle of torsion between adjacent discs: leftward 45°
   Number of discs: five discs for each portion The thus obtained modified polypropylene resin was subjected to evaluation of adhesion property and measurement of small-angle X-ray scattering by the same methods as in Example 1. The results are shown in Table 1.

Comparative Examples 2 and 3

The same procedure as defined in Example 1 was conducted except that the kneading configuration was replaced with that having three blocks each having combined right-handed and left-handed kneading portions as described below and a block length of 1L/D (mm) and being disposed on three positions of the screw at equal intervals, thereby producing a modified polypropylene resin.
(i) Right-handed Kneading Portion
   Disc thickness (mm): 0.1L/D
   Angle of torsion between adjacent discs: rightward 45°
   Number of discs: five discs for each disc set
   Number of disc sets: two sets
(ii) Left-handed Kneading Portion
   Disc thickness (mm): 0.1L/D
   Angle of torsion between adjacent discs: leftward 45°
   Number of discs: five discs for each disc set
   Number of disc sets: two sets The thus obtained modified polypropylene resin was subjected to evaluation of adhesion property and measurement of small-angle X-ray scattering by the same methods as in Example 1. The results are shown in Table 1.

Comparative Example 4

150 g of the same polypropylene as used in Example 1 and 14 g of the same maleic anhydride as used in Example 1 were dissolved in 1,000 ml of chlorobenzene heated to 160° C. in a nitrogen atmosphere. The obtained solution was mixed with 120 ml of a chlorobenzene solution containing 10 g of dicumyl peroxide, and the mixed solution was then heated for 7 hours while stirring. After completion of the reaction, the solution was reprecipitated in acetone to obtain maleic acid-modified polypropylene by a solution method.

The thus obtained modified polypropylene resin was subjected to evaluation of adhesion property and measurement of small-angle X-ray scattering by the same methods as in Example 1. The results are shown in Table 1.

<Evaluation of Results>

As is apparent from the comparisons between Example 2 and Comparative Example 1 and between Examples 4 and 6 and Comparative Example 2 which are respectively identical in mixing ratio (Example 6 and Comparative Example 2 are also identical in kneading conditions), the adhesion strengths of the resins obtained in Examples were in the range of 300 to 600 g/cm, whereas those of Comparative Examples were 80 to 150 g/cm. This clearly shows that the resins obtained in Examples exhibit a more excellent adhesion property than those of Comparative Examples.

Further, from the comparison between Example 6 and Comparative Example 1, and between Example 5 and Comparative Example 3, which are respectively almost identical in graft percentage of maleic acid, it is also confirmed that the resins obtained in Examples exhibit a more excellent adhesion property than those of Comparative Examples.

As apparently understood from Examples, the composition containing the unsaturated carboxylic acid-modified polyolefin resin according to the present invention and the other polyolefin-based resin exhibits a T-peel strength of not less than 300 g/cm when measured by peeling a film of the composition from an ethylene-vinyl alcohol copolymer film under such a condition that the unsaturated carboxylic acid content of the composition is adjusted to 0.08% by weight based on the total weight of resins therein. Therefore, such a composition according to the present invention can show an extremely high adhesion property.

Furthermore, the composition according to the present invention is excellent even as compared to the composition of Comparative Example 4 containing the modified polypropylene resin produced by a solution method.

vector (s) on X (abscissa) axis, and wherein said corrected scattering intensity ($I_1(s)$) is a value obtained by subtracting a product of an air scattering intensity and an X-ray transmittance and a background intensity based on thermal diffuse scattering, from the small-angle X-ray scattering intensity:

$$0.001 \geq Qn/P \geq 0.0001 \tag{II}$$

wherein Qn and P are values calculated from the following formulae (1) and (2):

TABLE 1

| Examples and Comparative Examples | Mixing ratio (parts by weight) | | | Kneading conditions | | |
|---|---|---|---|---|---|---|
| | PP* | Maleic anhydride | PERBUTYL D | Temp. (° C.) | Screw speed (rpm) | Feed amount (kg/hr) |
| Example 1 | 100 | 2 | 6 | 200 | 200 | 60 |
| Example 2 | 100 | 2 | 0.5 | 200 | 200 | 60 |
| Example 3 | 100 | 2 | 1 | 200 | 200 | 60 |
| Example 4 | 100 | 2 | 1.5 | 200 | 200 | 30 |
| Example 5 | 100 | 2 | 6 | 200 | 200 | 60 |
| Example 6 | 100 | 2 | 1.5 | 200 | 200 | 60 |
| Example 7 | 100 | 2 | 1.5 | 200 | 400 | 150 |
| Comparative Example 1 | 100 | 2 | 0.5 | 200 | 400 | 60 |
| Comparative Example 2 | 100 | 2 | 1.5 | 200 | 200 | 60 |
| Comparative Example 3 | 100 | 2 | 3 | 200 | 200 | 60 |
| Comparative Example 4 | — | — | — | — | — | — |

| Examples and Comparative Examples | Evaluation | | X-ray scattering data | | | |
|---|---|---|---|---|---|---|
| | Amount of maleic acid grafted (wt. %) | T-peel strength (g/cm) | A | Normalized invariant Qn | P | Qn/P |
| Example 1 | 1.43 | 550 | −4.09 | 2.27E − 02 | 194.1 | $1.17 \times 10^{-4}$ |
| Example 2 | 0.96 | 320 | −3.92 | 2.91E − 02 | 197.8 | $1.47 \times 10^{-4}$ |
| Example 3 | 1.2 | 510 | −3.61 | 2.91E − 02 | 207.7 | $1.40 \times 10^{-4}$ |
| Example 4 | 1.43 | 610 | −3.67 | 3.38E − 02 | 205.8 | $1.64 \times 10^{-4}$ |
| Example 5 | 1.69 | 580 | −3.93 | 2.88E − 02 | 205.1 | $1.40 \times 10^{-4}$ |
| Example 6 | 1.24 | 580 | −4.3 | 3.19E − 02 | 193.1 | $1.65 \times 10^{-4}$ |
| Example 7 | 1.4 | 510 | −3.03 | 3.12E − 02 | 210.4 | $1.48 \times 10^{-4}$ |
| Comparative Example 1 | 1.24 | 150 | −3.83 | 1.96E − 02 | 201.7 | $0.97 \times 10^{-4}$ |
| Comparative Example 2 | 1.36 | 80 | −4.07 | 9.08E − 03 | 201 | $0.45 \times 10^{-4}$ |
| Comparative Example 3 | 1.63 | 100 | −4 | 7.42E − 03 | 205.5 | $0.36 \times 10^{-4}$ |
| Comparative Example 4 | 4.7 | 250 | −1.86 | — | — | — |

Note:
*Polypropylene

What is claimed is:
1. An unsaturated carboxylic acid-modified polyolefin resin composition consisting essentially of polypropylene modified with an unsaturated carboxylic acid and satisfying the following formulae (I) and (II) with respect to a small-angle X-ray scattering which is incident perpendicularly on said composition melted at 170° C.:

when a wave number vector (s) is in the range of 0.003 Å$^{-1}$ to 0.006 Å$^{-1}$, $$-5.0 \leq A \leq -3.0 \tag{I}$$

wherein A represents a gradient of a characteristic curve obtained by plotting logarithms of a corrected scattering intensity ($I_1(s)$) on Y (ordinate) axis and the wave number $$Qn = \int_{0.003}^{0.007} s^2 I_1(s) ds \bigg/ \int_{0.02}^{0.04} s^2 I_2(s) ds \tag{1}$$

wherein s is a wave number vector, $I_1(s)$ is a corrected scattering intensity, and $I_2(s)$ is a scattering intensity at 170° C. of polyolefin before modification, $$P = \int_{0.003}^{0.007} s^2 I_1(s) ds / M \tag{2}$$

wherein M is an average value of $s^4 I_1(s)$ when s is in the range of 0.003 Å$^{-1}$ to 0.004 Å$^{-1}$.

2. An unsaturated carboxylic acid-modified polyolefin resin composition according to claim 1, wherein said unsaturated carboxylic acid is maleic acid or maleic anhydride.

3. An unsaturated carboxylic acid-modified polyolefin resin composition according to claim 1, wherein said polyolefin resin before modification has a melt flow rate of 0.01 to 200 g/10 minutes.

4. An unsaturated carboxylic acid-modified polyolefin resin composition according to claim 1, wherein the modification of said polyolefin resin with said unsaturated carboxylic acid is carried out by melt-kneading said polyolefin resin and said unsaturated carboxylic acid in the presence of an organic peroxide.

5. An unsaturated carboxylic acid-modified polyolefin resin composition according to claim 1, wherein said polyolefin resin modified with said unsaturated carboxylic acid has a melt flow rate of 200 to 2,000 g/10 minutes, and the amount of said unsaturated carboxylic acid grafted onto said polyolefin resin is 0.3 to 2.5% by weight.

6. A polyolefin-based resin composition comprising:

the unsaturated carboxylic acid-modified polyolefin resin composition according to claim 1, and another polyolefin-based resin; and having a T-peel strength of not less than 300 g/cm when measured between an ethylene-vinyl alcohol copolymer film and a film formed from said polyolefin-based resin composition having an unsaturated carboxylic acid content of 0.08% by weight based on the total weight of resins contained in said composition.

* * * * *